Dec. 15, 1959 W. V. SINES 2,917,325
STORY BOOK AND METHOD OF ASSEMBLY
Filed July 29, 1957 4 Sheets-Sheet 1
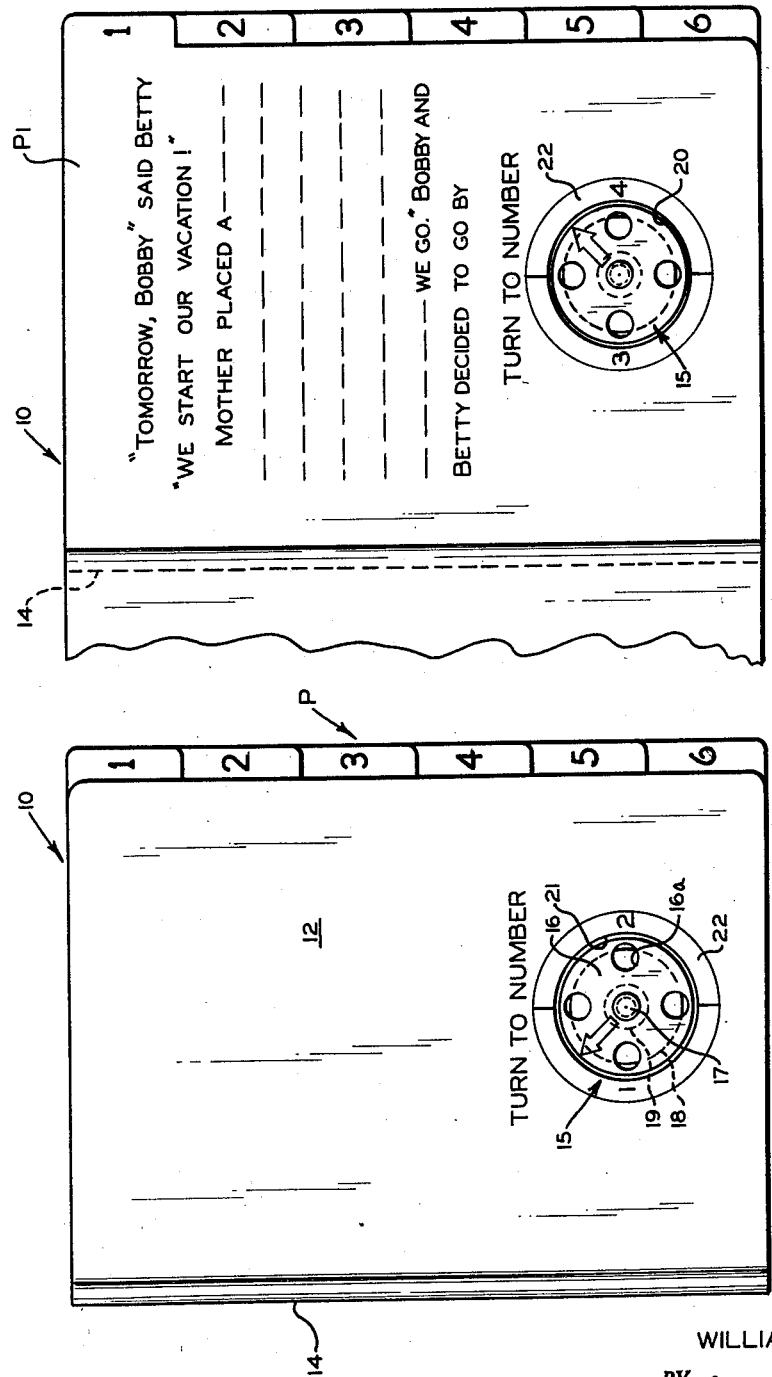
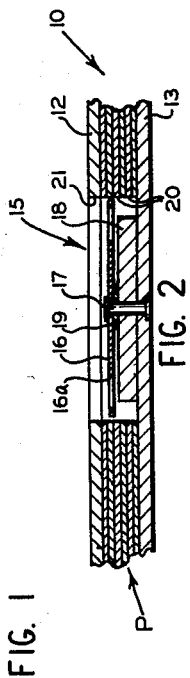
INVENTOR.
WILLIAM V. SINES
BY *Karman & Karman*
ATTORNEYS Dec. 15, 1959  W. V. SINES  2,917,325
STORY BOOK AND METHOD OF ASSEMBLY
Filed July 29, 1957  4 Sheets-Sheet 2

INVENTOR.
WILLIAM V. SINES

BY
ATTORNEYS

INVENTOR.
WILLIAM V. SINES

BY

ATTORNEYS

Dec. 15, 1959   W. V. SINES   2,917,325
STORY BOOK AND METHOD OF ASSEMBLY
Filed July 29, 1957   4 Sheets-Sheet 4

INVENTOR.
WILLIAM V. SINES
BY
ATTORNEYS

United States Patent Office 2,917,325
Patented Dec. 15, 1959

2,917,325

STORY BOOK AND METHOD OF ASSEMBLY

William V. Sines, Flint, Mich., assignor to J. George O'Brien, Harold D. Draper, and R. Lee Gilbert, Saginaw, Mich.

Application July 29, 1957, Serial No. 674,933

4 Claims. (Cl. 283—63)

This invention relates to a story book for children and to its method of assembly, and more particularly the invention relates to a child's book having a plurality of sets of pages, each page of a set of pages having printed thereon a story part different from the story part on other pages of the same set and each of the pages of succeeding sets having continuity with each of the pages of the immediately preceding set so that by reading one page of each set in succession a complete story is told which is different from the story told by any other combination of pages in the several sets. The invention also is concerned with the provision of a book of the kind referred to having incorporated therein manipulatable means for selecting by chance which of the pages of successive sets of pages may be read.

An object of the invention is to provide a child's story book composed of a number of pages arranged in sets of story parts, each page of a set having a predetermined portion of a story printed thereon and each page of succeeding sets having continuity with each page of a preceding set so as to enable a large number of story combinations to be made up from relatively few pages.

Another object of the invention is to provide a story book construction of the kind referred to and which incorporates means for determining by chance which of the pages of successive sets of pages will be combined to make up a story.

A further object of the invention is to provide a method of assembling the pages of the book to enable the desired results to be achieved.

Other objects and advantages of the invention will be pointed out specifically or will become apparent from the following description when it is considered in conjunction with the appended claims and the accompanying drawings, in which:

Figure 1 is a plan view of a book constructed and assembled in accordance with the invention, the book being closed;

Figure 2 is a fragmentary, transverse sectional view of the structure shown in Figure 1;

Figure 3 is a fragmentary plan view of the book, the cover being opened to Page 1;

Figure 5:
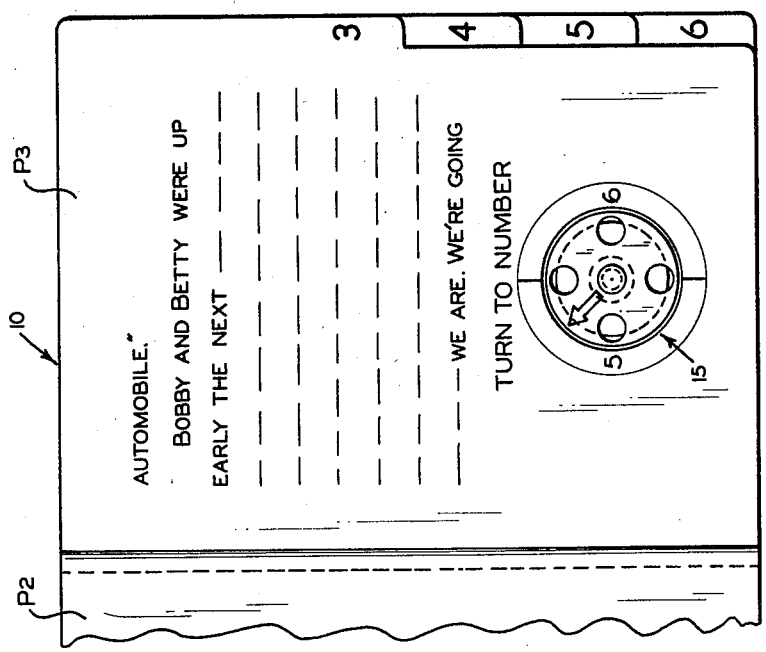
Figure 5 is a view similar to Figure 4, but showing the book opened to Page 3.

A book constructed in accordance with the invention is represented generally in the drawings by the reference character 10 and comprises a front cover 12 and a back cover 13, the covers being suitably bound together in a known manner as at 14. Between the covers is a plurality of pages P, there being six pages, $P^1$, $P^2$, $P^3$, $P^4$, $P^5$, and $P^6$, in the illustrative embodiment of the invention disclosed in the drawings and each page carrying at its right hand edge an identifying symbol such as a page number.

The pages of the book are arranged according to convention; that is, the beginning of a story will be at the front of the book and the end of a story will be at the back of the book. However, not all of the pages of the book constructed in accordance with the invention are so arranged that they will be read one after another. Instead, the pages of the book are arranged in sets of corresponding story parts so that only one page of each set need be read in succession in order to tell a complete story.

Figure 4:
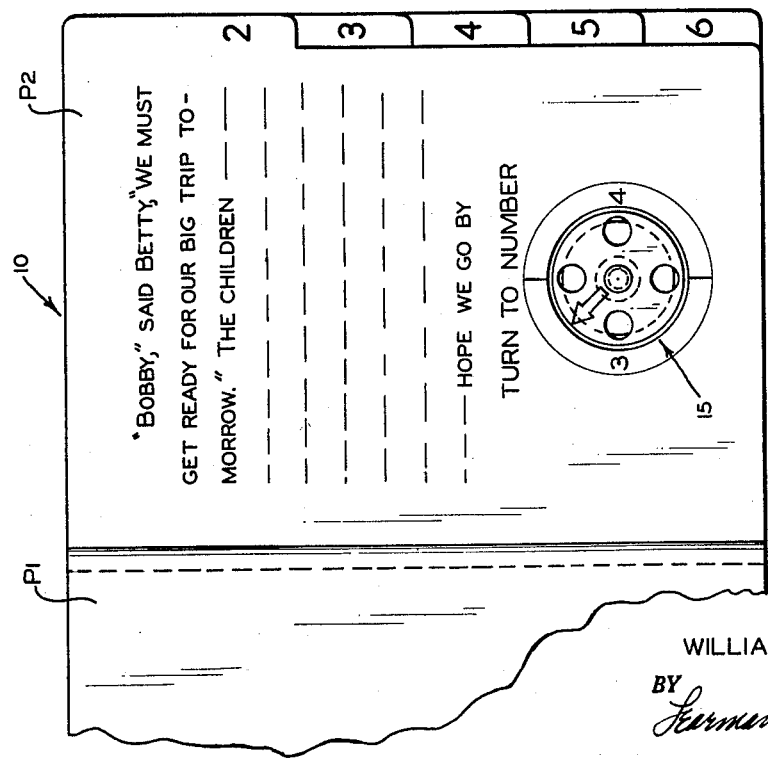
Figure 4 is a view similar to Figure 3, but showing the book opened to Page 2.

Referring to Figures 3 and 4, each of pages $P^1$ and $P^2$ has printed thereon the beginning of a separate story. Thus, as is indicated in Figure 3, the substance of the text printed on page $P^1$ has to do with a vacation trip, whereas the substance of the text printed on page $P^2$ relates to a trip generally, but not necessarily having anything to do with a vacation. In this connection the general theme of each of the pages in the book must be somewhat uniform in order that the story told by any combination of pages will be meaningful, but the particular expression of the theme on separate pages of the book may have considerable latitude. In the embodiment of the invention chosen for illustration, the theme of the book is travel, but in the story begun on page $P^1$, the travel is for purposes of vacation, whereas in the story begun on page $P^2$ the travel is for some other purpose.

Figure 6:
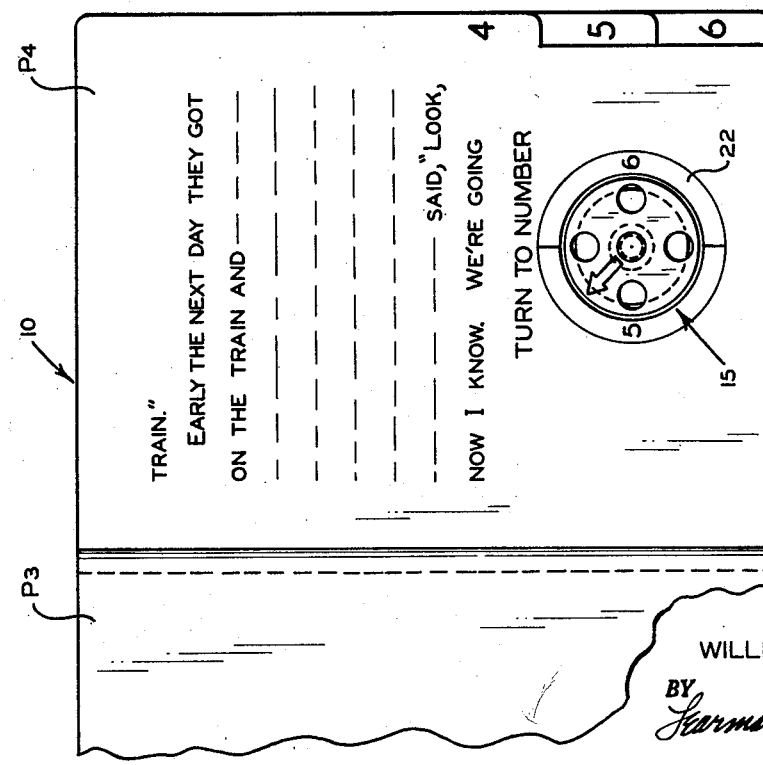
Figure 6 is a view similar to Figure 5, but showing the book opened to Page 4.

The last sentence on each of pages $P^1$ and $P^2$ is incomplete and each ends in a common word which, in the illustrative embodiment, is the word "by." Referring now to Figures 5 and 6, the first word on each of pages $P^3$ and $P^4$ is an object of the preposition "by." Thus, either of pages $P^3$ and $P^4$ may be read following either of pages $P^1$ and $P^2$ without destroying the context of the story. In other words, each of pages $P^3$ and $P^4$ has continuity with either of pages $P^1$ and $P^2$.

Each of pages $P^3$ and $P^4$ has printed thereon another part of a story which follows normally the beginning of either story appearing on pages $P^1$ and $P^2$. The general theme of pages $P^3$ and $P^4$ conforms to the overall theme of travel, but is concerned primarily with the mode of travel. In the case of page $P^3$, however, the travel is by means of automobile, whereas in the case of page $P^4$ the travel is by means of train. The last sentence of each of pages $P^3$ and $P^4$ also is incomplete and each sentence ends in the common word "going."

Figure 7:
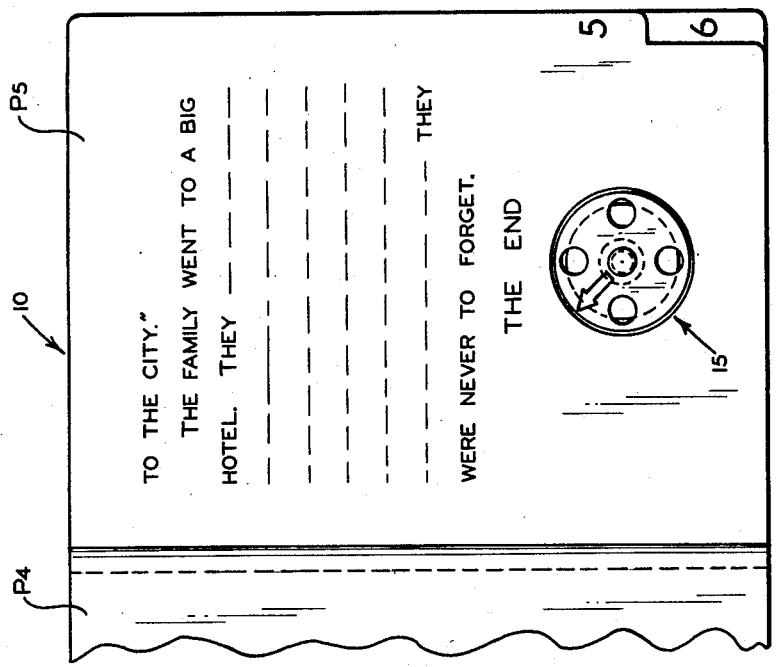
Figure 7 is a view similar ot Figure 6, but showing the book opened to Page 5.
Figure 8:
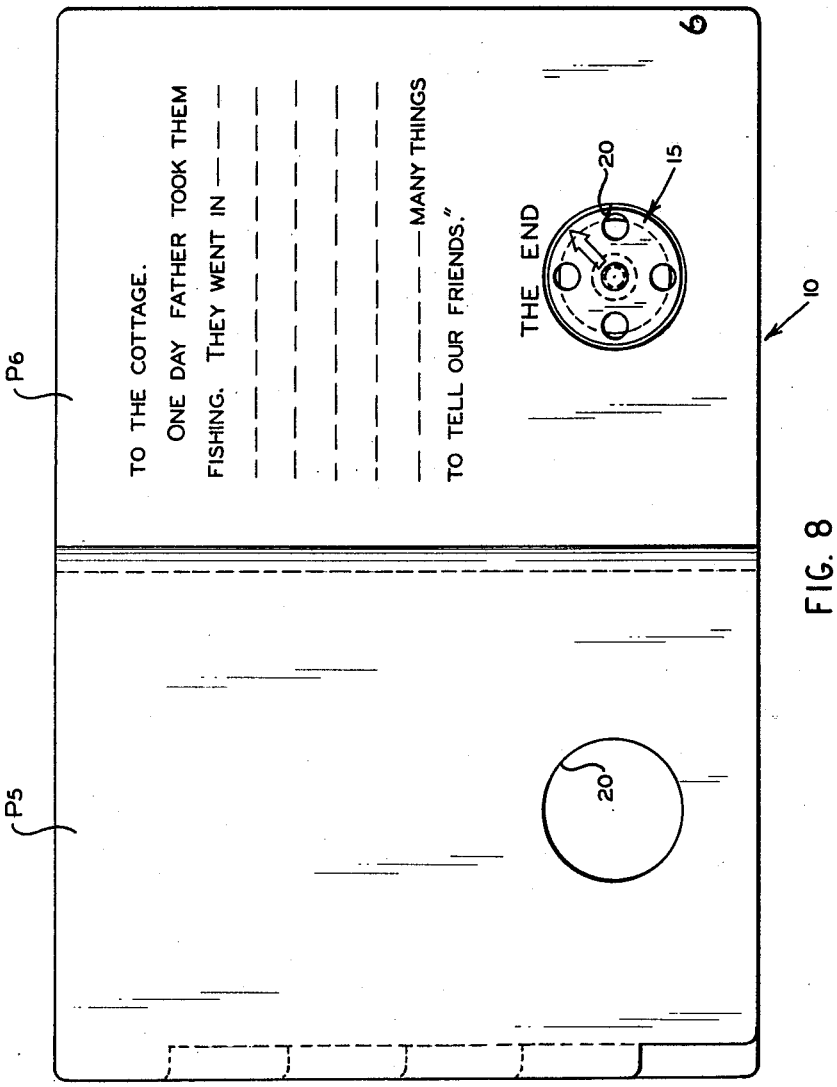
Figure 8 is a view similar to Figure 7, but showing the book opened to the last page.

Referring now to Figures 7 and 8, the first word on each of pages $P^5$ and $P^6$ forms an object of the verb "going," but in each instance expresses a different thought. However, each thought expressed follows naturally the material on either of the preceding pages $P^3$ and $P^4$ since the general theme still has to do with travel and, in the case of pages $P^5$ and $P^6$, has to do with the destination. Each of pages $P^4$ and $P^6$ has printed thereon the end or last part of the story which would be told by a reading of any one page of each of the two sets of pages preceding the set of pages $P^5$ and $P^6$.

When pages have been printed and assembled in accordance with the disclosure, there will be provided a book which, in the illustrative embodiment of the invention, contains three sets of two pages each, or, in other words, six pages, of which three must be read to complete a story. From these six pages eight different stories may be told, depending upon which pages of the three sets are combined. For example, one story may be told by combining, that is, reading in succession, pages $P^1$, $P^3$, and $P^6$, whereas another story may be told by combining pages $P^1$, $P^4$, and $P^6$. Still another story may be told by combining pages P², P³, and P⁵ or pages P², P⁴, and P⁵, or pages P², P⁴, and P⁶, and so on.

Various devices may be used to provide an arbitrary or chance selection of which pages of the several sets should be combined to make up a story, but it is preferred that each book have incorporated as a part thereof manipulatable means for selecting from the pages of each set of pages which page is to follow preceding pages. In the disclosed embodiment of the invention, the selecting means is indicated generally by the reference character 15, which as is best shown in Figure 2, may comprise a pointer 16 rotatably mounted on a double headed spindle 17 which, in turn, is mounted in a cylindrical block 18 and in the rear cover 13 in such manner as to assure its retention. Between the block 18 and the pointer 16 may be mounted a washer 19 or the like for supporting the pointer above the upper surface of the block 18 so as to permit free rotation of the pointer. Inasmuch as the selecting means 15 extends upwardly from the cover 13, each of the pages of the book is provided with an opening 20 of a diameter larger than the length of the pointer 16. Preferably the cover 12 also is provided with an opening 21 of a size corresponding substantially to the size of the opening 20.

The selecting means 15 is intended to be used by the reader of the book to select by chance the combination of pages from the several sets of pages which are to be read to make up a story. In order to effect a completely fortuitous selection, the outside of the cover 12 is provided with a scale 22 bearing indicia corresponding to the symbols carried by the set of pages on which the beginning of a story is printed. Each of the other pages of the book also may be provided with a scale 22 bearing indicia corresponding to the symbols provided on the set of pages immediately following and adapted to be read in conjunction with the pointer for selecting by chance which of the following set of pages is to be read.

In the illustrative embodiment of the invention, the scale 22 on the cover 12 is provided with two symbols, namely, "1" and "2," these symbols corresponding to the numbers of the pages of the set on which the beginning of a story is printed. To select the first page to be read, the reader places his finger in a hole 16a formed in the disc 16 and spins the latter while the book is closed. When the disc comes to rest, the pointer will indicate one of the two symbols on the scale 22 and the reader will turn to the page bearing the corresponding symbol. In Figure 1, the pointer indicates that page 1 should be read to begin a story. When the reader finishes reading page 1, he again will spin the pointer 16 so as to ascertain which of the set of pages bearing the intermediate portion of the story should be read next. In Figure 3 the pointer indicates that page 4 should be read after page 1, so the reader will turn to page 4, bypassing pages 2 and 3. Upon completing the reading of page 4, the reader again spins the pointer 16 to learn which of pages 5 and 6 should be read to complete the story. In Figure 5, the pointer points to the symbol corresponding to page 5, so the reader turns to page 5 and finishes the story.

The indicating means 15 disclosed herein is a particularly convenient device to use for selecting the various pages to be read inasmuch as it is self-contained within the book and requires but a single manipulatable pointer disc capable of indicating, in conjunction with the scales 22, each successive page to be read.

In its simplest form, a book constructed in accordance with the invention would consist of three pages. Such a book could consist of a set comprising one page on which the beginning of a story is printed and a set of two pages, either of which would constitute the end of the story. Alternatively, there could be two pages each containing the beginning of a story and one following page containing the end of the story. In either event, the following page or pages would have continuity with the preceding page or pages. The disclosed embodiment of the invention is a simplified arrangement of six pages. It should be understood, however, that any number of pages may be included, in which event the number of stories possible will be greatly increased. One commercial form of the invention is made up of twenty pages arranged in four sets of five pages each. That is, the first set of pages comprises five beginning story parts, the second set comprises five pages of first intermediate story parts, the third set comprises five pages of second intermediate story parts, and the fourth set comprises five pages of story ending parts, each page of each of the second, third and fourth sets of pages having continuity with each of the pages of the first, second and third sets of pages, respectively. From the twenty-page book, therefore, can be made up 625 complete and different four-page stories.

The disclosed embodiment of the invention is representative of presently preferred methods and apparatus. This disclosure, however, is intended to be illustrative of the invention rather than definitive thereof. The invention is defined in the claims.

I claim:

1. A book construction comprising a plurality of sections each composed of a number of pages, each of said pages having an identifying symbol different from the symbol of any other page; a leaf preceding the first page of the first section and having a set of symbols corresponding to all of the symbols of the pages of said first section, each of the pages of each section having a set of symbols corresponding to all of the symbols of the pages of the next succeeding section; and chance selecting means associated with each of said sets of symbols operable to select by chance to which page of the next succeeding section said book is to be opened in consecutive order from said leaf to the final section.

2. The construction set forth in claim 1 wherein each of said sets of symbols is arranged in a circle and wherein said chance selecting means comprises a needle rotatable about an axis at the center of said circle so as to point to any one of the symbols of a set.

3. The construction set forth in claim 2 including a back cover following the last page of the final section and on which said needle is mounted, and wherein each of said pages and said leaf is provided with an opening concentric with its said circle and in register with said needle.

4. A book construction comprising a plurality of sections each composed of a number of pages, each of said pages having an identifying symbol different from the symbol of any other page; a leaf preceding the first page of the first section and having a set of symbols corresponding to all of the symbols of the pages of said first section, each of the pages of each section having a set of symbols corresponding to all of the symbols of the pages of the next succeeding section, each of the pages of the first section having the beginning part of a different story printed thereon, and each of the pages of each of the succeeding sections having a different story part printed thereon which has continuity with each story part on each page of the immediately preceding section; and chance selecting means associated with each of said sets of symbols operable to select by chance to which page of the next succeeding section said book is to be opened in consecutive order from said leaf to the final section.

References Cited in the file of this patent

UNITED STATES PATENTS

| | | |
|---|---|---|
| 462,956 | McLoughlin | Nov. 10, 1891 |
| 698,603 | Weiderseim | Apr. 29, 1902 |
| 1,028,921 | Wagner | June 11, 1912 |
| 2,676,019 | Steinberg | Apr. 20, 1954 |